United States Patent
Richter

(10) Patent No.: US 11,906,127 B2
(45) Date of Patent: Feb. 20, 2024

(54) SIGNAL LIGHTS FOR A MOTOR VEHICLE LIGHTING SYSTEM

(71) Applicant: Marelli Automotive Lighting Reutlingen (Germany) GmbH, Reutlingen (DE)

(72) Inventor: Michael Richter, Pfullingen (DE)

(73) Assignee: Marelli Automotive Lighting Reutlingen (Germany) GmbH, Reutlingen (DE)

( * ) Notice: Subject to any disclaimer, the term of this patent is extended or adjusted under 35 U.S.C. 154(b) by 0 days.

(21) Appl. No.: 18/185,542

(22) Filed: Mar. 17, 2023

(65) Prior Publication Data
US 2023/0296222 A1 Sep. 21, 2023

(30) Foreign Application Priority Data
Mar. 18, 2022 (DE) ...................... 10 2022 106 420.4

(51) Int. Cl.
| | | |
|---|---|---|
| F21S 43/237 | (2018.01) | |
| F21S 43/249 | (2018.01) | |
| F21S 43/245 | (2018.01) | |
| F21S 43/40 | (2018.01) | |
| F21Y 103/20 | (2016.01) | |

(52) U.S. Cl.
CPC .......... F21S 43/237 (2018.01); F21S 43/245 (2018.01); F21S 43/249 (2018.01); F21S 43/40 (2018.01); F21Y 2103/20 (2016.08)

(58) Field of Classification Search
CPC ....... F21S 43/237; F21S 43/245; F21S 43/249
See application file for complete search history.

(56) References Cited

U.S. PATENT DOCUMENTS

| | | | | |
|---|---|---|---|---|
| 6,200,006 B1* | 3/2001 | Natsume | ................. | F21S 43/30 |
| | | | | 362/348 |
| 6,280,044 B1* | 8/2001 | Kusakabe | ............ | G02B 6/0038 |
| | | | | 362/558 |
| 9,651,211 B2* | 5/2017 | Potter | .................... | F21S 43/235 |

(Continued)

FOREIGN PATENT DOCUMENTS

| | | |
|---|---|---|
| DE | 102013104174 A1 | 10/2014 |
| DE | 102013104176 A1 | 10/2014 |

(Continued)

OTHER PUBLICATIONS

Search Report for German Patent Application No. 10 2022 106 420.4 dated Nov. 18, 2022.

*Primary Examiner* — Eric T Eide
(74) *Attorney, Agent, or Firm* — Howard & Howard Attorneys PLLC

(57) ABSTRACT

The invention relates to a signal light for a motor vehicle that has a fiber optic rod, which has a light emitting surface and a rear surface, in which deflection elements are located, and which has two side walls, and numerous pairs of reflectors and light sources, which are in a row in the rear surface, and which project light bundles through the fiber optic rod, transverse thereto. The fiber optic rod has two rear walls, each of which has deflection element edge and side wall edge, and extends longitudinally between the deflection elements and the side walls. The side wall edges are further apart than the deflection element edges in a cross section of the fiber optic rod that is transverse to the longitudinal direction thereof.

11 Claims, 3 Drawing Sheets

(56) References Cited

U.S. PATENT DOCUMENTS

| | | | |
|---|---|---|---|
| 11,460,164 B1* | 10/2022 | Yu | F21S 43/249 |
| 2005/0189545 A1* | 9/2005 | Tazawa | F21S 43/237 |
| | | | 257/79 |
| 2014/0321139 A1* | 10/2014 | Bungenstock | F21S 41/10 |
| | | | 362/511 |
| 2016/0091653 A1 | 3/2016 | Ban et al. | |
| 2016/0312973 A1 | 10/2016 | Brosinger et al. | |
| 2017/0089540 A1* | 3/2017 | Sagna | F21S 43/239 |
| 2019/0293857 A1* | 9/2019 | Martoch | G02B 6/0018 |

FOREIGN PATENT DOCUMENTS

| | | |
|---|---|---|
| DE | 102013104871 A1 | 11/2014 |
| DE | 102019107356 A1 | 9/2019 |
| EP | 2743565 A1 | 6/2014 |
| EP | 3112215 A1 | 1/2017 |
| EP | 3112216 A1 | 1/2017 |
| WO | 2015090535 A1 | 6/2015 |

* cited by examiner

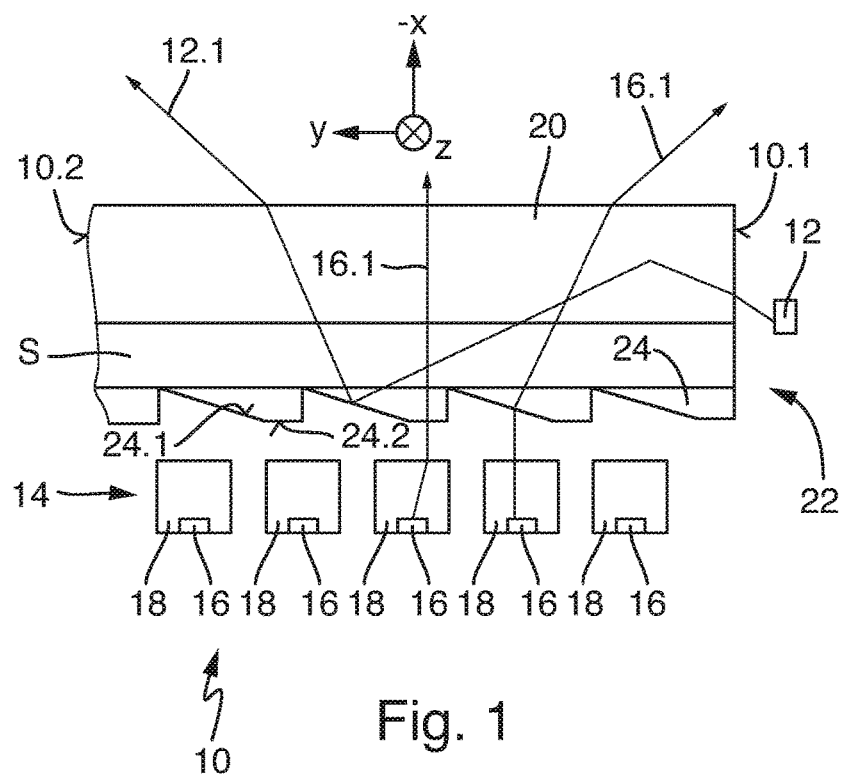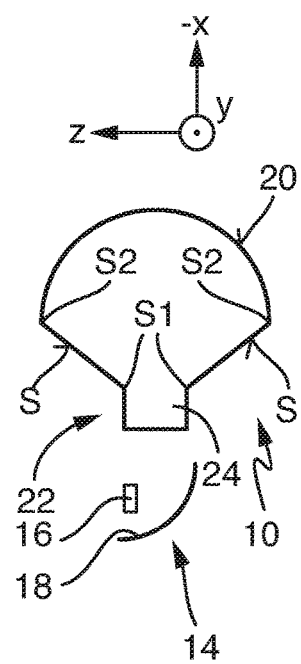
Fig. 1  Fig. 2
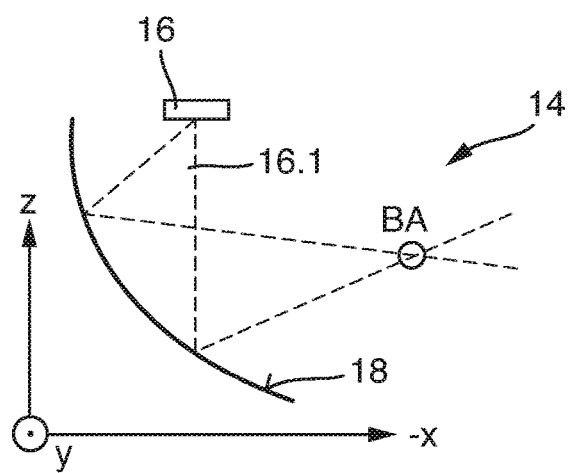
Fig. 3

SIGNAL LIGHTS FOR A MOTOR VEHICLE LIGHTING SYSTEM

CROSS-REFERENCE TO RELATED APPLICATIONS

The present application claims priority to and all the benefits of German Patent Application No. 10 2022 106 420.4, filed on Mar. 18, 2022, which is hereby expressly incorporated herein by reference.

BACKGROUND OF THE INVENTION

1. Field of the Invention

The present invention relates to a signal light for a motor vehicle lighting system.

2. Description of the Related Art

Signal lights having a fiber optic rod extending in the longitudinal direction and which have a light emitting surface extending along the longitudinal direction that has a convex surface transverse to the longitudinal extension are generally known in the related art. Signal lights of this type also have a rear surface opposite the light emitting surface, in which a row of light deflection elements are placed along the longitudinal direction. Signal lights are also known to have two side walls, each of which has a rear surface edge and a light emitting surface edge, and extends in the longitudinal direction between the rear surface edge and the light emitting surface edge. Signal lights of this type are also known to have numerous pairs of reflectors and light sources. The pairs form a row along the longitudinal direction and are configured to project light bundles through the fiber optic rods, the main beam directions of which are transverse to the longitudinal direction thereof.

Motor vehicle lighting systems often need to be designed such that the signal lights can produce light of different colors and switching states from a single light emitting surface. A common example of this comprises white daytime running lights and yellow blinker lights.

The generation of a light distribution is also referred to as a lighting function below. As long as the two lighting functions are static, as is the case when the lights are off, and no light is emitted through the light emitting surface, or when light is emitted simultaneously from the entire light emitting surface, fiber optic rods offer unrivaled quality in terms of homogeneity (uniform brightness over the entire light emitting surface) in relation to efficiency (the ratio of the amount of light projected from the light emitting surface to the amount of energy radiating from the light source), and are usually the best solutions in elongated light emitting surfaces that range from 4 mm to 14 mm high, and are therefore used most frequently.

If the light emitting surface is broken down into segments, in order to obtain animated effects, for example, such as blinkers that progress outward from the middle, these fiber optic rods are less than ideal.

Rows of reflectors, or direct imaging lenses enable a simple separation of lit and unlit segments along a longitudinal light emitting surface on a fiber optic rod. The disadvantage with this is that homogeneity is often compromised. This is particularly the case if two light functions of different colors are to be obtained with the same light emitting surface. This happens when two LED chips have to be placed in the focal point of the imaging lens.

With the signal lights known per se, a good homogeneity of the fiber optic rod is combined with the possibility of segmenting using reflectors or direct imaging lenses. In this case, one function (usually the daytime running lights—in which homogeneity has a high priority) is obtained with a fiber optic rod, while the other function (usually the blinker effect, in which segmentation is the priority) is obtained with reflectors or direct imaging lenses placed behind the fiber optic rod.

With this approach, the segmented light function must pass through the fiber optic rod in order to be able to make use of the same light emitting surface. The use of the same light emitting surface often involves undesired differences in the light distributions, however, such as the positions and levels of the intensity maximums. As such, obtaining the maximum in the light distribution, which is located in the center thereof, is a particular problem for the functions passing therethrough.

There is a need for signal lights for motor vehicles with which two signal functions can be obtained, preferably with different colors. The appearance of the signal lights should be of a uniform brightness for this, and it should be possible for one of the two functions to be animated.

Similar problems have already been explored in the prior art. EP 3 112 215 and EP 3 112 216 disclose systems in which fiber optic plates are used, one surface of which serves as a reflecting surface. The cross section of the optical fiber with which a first light function is generated is nearly circular. A similar system is disclosed in WO2015/090535. A system is disclosed in US2016/091653 that uses so-called thick-wall optics. The thick-wall optics are formed by a fiber optic plate. In this system, the thick-wall optics do not normally generate their own light function.

SUMMARY OF THE INVENTION

The object of the invention is to therefore create a signal light with a fiber optic rod that has an elongated light emitting surface and is designed to generate two light functions, only one of which is segmented. The segmented light function should pass laterally through the fiber optic rod and have a light distribution similar to the non-segmented function. Furthermore, higher intensities should be generated, in particular in the center of the light distribution, than with the known signal lights. Moreover, the efficiency of the fiber optic rod should not be reduced in the other light function.

These problems are solved with a signal light according to the invention. The signal light includes a fiber optic rod that has two rear walls, each of which has a deflection element edge and a side wall edge, and extends in the longitudinal direction between the row of light deflection elements and the side walls, and the side wall edges are further apart than the deflection element edges in a cross section of the fiber optic rod that is transverse to the longitudinal extension thereof.

With these features, a portion of the light from the light bundle passing through the fiber optic rod transverse to its longitudinal extension strikes the rear walls and is deflected by the side walls at such a steep angle to the light emitting surface that it is emitted therefrom without first being refracted at a deflecting element. It is this refraction that would normally contribute to the undesired anomalies in the two light distributions. By preventing this undesired refraction, a desired greater similarity is obtained between the two light distributions, which are formed by the light first propagated longitudinally through the fiber optic rod, and the light distribution that is generated by the light reflected by the reflectors such that it passes laterally through the longitudinal extension of the fiber optic rod. These advantages are obtained without reducing the efficiency of the fiber optic rod.

In one embodiment, a recess is formed in the back of the rear walls, and the convex light emitting surface has a focal curve that follows the elongated shape of the fiber optic rod and runs behind the series of deflection elements, seen from the convex light emitting surface.

Each reflector and light source pair is configured to convert the spherical wave fronts coming from light sources, ideally forming light sources focused on a point, into cylindrical wave fronts which have the focal axis BA.

The focal axis may be parallel to the y-axis. The y-axis runs in the longitudinal direction of the fiber optic rod, which can also be referred to as the direction of its longitudinal extension.

In another embodiment, the focal axis BA is tilted at an angle to the longitudinal extension in the y-axis.

The focal axis also corresponds to the longitudinal direction of the fiber optic rod at the point where it is immediately in front of the reflector in the main reflection direction of the associated reflector, such that it follows the contour of the light emitting surface.

Each pair may also be configured to focus its light bundle into a focal axis for a row of deflection elements in the fiber optic rod.

In another embodiment, the reflection surfaces of the reflectors have a diffusing structure superimposed on the fundamental form thereof.

The diffusing structures are also preferably designed to diffuse light 2° to 5° vertically, along the z-axis, and 5° to 10° horizontally, along the y-axis.

In another embodiment, the fiber optic rod has a first end at which a light source with which light is projected into the fiber optic rod is located, and a second end, lying opposite the first end, wherein each pair of adjacent deflection elements are separated from one another at a distance that decreases as the distance from the first end increases. In one embodiment, the distance between adjacent deflection elements is not less than 20% of the distance to two adjacent deflection elements.

The rear walls and side walls may also be designed such that at least a part of the light from the light sources reflected by the reflectors strikes the rear walls through refraction, and this part is deflected into a central region of the light distribution that can be projected by the signal lights with the light from the light sources reflected on the side walls.

Further effects and/or advantages can be derived from the dependent claims, the description, and the drawings.

It is understood that the features specified above and explained below can be used not only in the respective given combinations, but also in other combinations or in and of themselves, without abandoning the scope of the present invention. Other objects, features and advantages of the present invention will be readily appreciated as the same becomes better understood after reading the subsequent description taken in connection with the accompanying drawings.

BRIEF DESCRIPTION OF THE DRAWINGS

Exemplary embodiments of the invention are illustrated in the drawings, and shall be explained in greater detail in the following description. Therein, schematically in each case:

FIG. 1 shows a side view of a signal light known per se, of the type specified in the introduction;

FIG. 2 shows a view of one end or a cross section of the signal light shown in FIG. 1, from above;

FIG. 3 shows a cut through a light source and reflector pair;

DETAILED DESCRIPTION OF THE INVENTION

Figure 4:
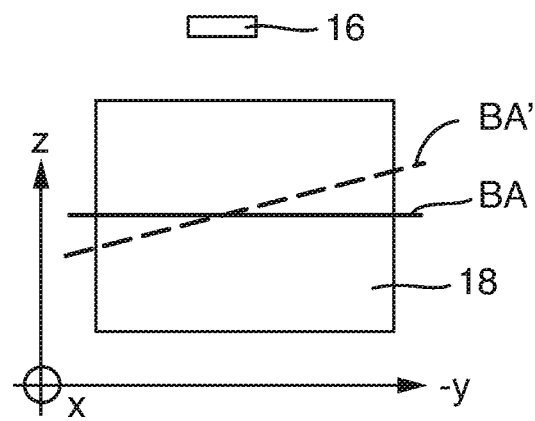
FIG. 4 shows a front view without the light beam path, in order to illustrate the position of a focal axis of the reflector.

FIG. 1 shows a side view of an assembly comprising a fiber optic rod 10 known per se, a first light source 12, and a series of pairs 14, each composed of a second light source 16 and a reflector 18. In the side view, the fiber optic rod 10 extends longitudinally along the y-axis between a first end 10.1 and second end 10.2. The fiber optic rod 10, first light source 12, and pairs 14, each comprising a light source 16 and a reflector 18, form a signal light.

FIG. 2 shows the assembly shown in FIG. 1 from above, looking at a cross section of the signal light that is transverse to the side view shown in FIG. 1. The perspective in FIG. 2 corresponds to the y-axis in FIG. 1. The fiber optic rod 10 has a light emitting surface 20 extending along the y-axis, which is convex in the direction transverse to the longitudinal extension, and rear surface 22 that is opposite the light emitting surface 20. Deflection elements 24 form a row in the rear surface 22 extending along the y-axis.

The pairs 14 form a row extending along the longitudinal y-axis and configured to project light bundles through the fiber optic rod 10, each of which has a main beam direction in the negative direction along the x-axis that is transverse to the longitudinal y-axis.

The fiber optic rod 10 has two side walls S, each of which has a rear surface edge S1 and a light emitting surface edge S2, and extends longitudinally along the y-axis between the rear surface 22 and the light emitting surface 20.

The x, y, and z-axes are at right angles to one another, and form a right handed coordinate system, with an origin at the center of a cross section of the fiber optic rod 10 lying in the x, z plane. The x-axis corresponds to the main beam direction of the signal light, which is in the direction of travel or opposite the direction of travel. The z-axis corresponds to the vertical axis of the vehicle. Unlike in FIG. 1, the longitudinal extension of the fiber optic rod 10 in the signal light according to the invention does not have to be straight, but instead can be curved, in which case the coordinate system can also correspond thereto.

The light 12.1 from the first light source 12 propagates light in the fiber optic rod in a direction that is at a smaller angle to y-axis than that to the x-axis and that to the z-axis, both of which are at a right angle thereto. The first light source 12 emits white light 12.1, for example, for daytime running lights.

This light 12.1 is projected into the fiber optic rod 10 by a first light source 12 at the end of the fiber optic rod in relation to its longitudinal extension, and potentially reflected numerous times on the side walls S and/or the light emitting surface 20, before striking a deflection element 24 and deflected there toward the light emitting surface 20 such that it is emitted there. The deflection elements 24 have reflection surfaces 24.1 for this that are at an angle to the y-axis. This emitted light 12.1 also has a directional component in the y-axis in this case, as shown in FIG. 1.

Such a light 12.1 has also proven to exhibit a high efficiency and a desired homogeneously bright appearance of the light emitting surface 20, as well as a light distribution with a pronounced central intensity maximum, for an observer.

For this reason, this configuration of the light propagation direction in the fiber optic rod 10 and basically transverse thereto deflection from the fiber optic rod 10 is preferred for a daytime running light.

The signal light also has numerous pairs 14, each composed of one reflector 18 and one second light source 18. The pairs 14 are placed in a row along the y-axis and configured to project light bundles 16.1 through the fiber optic rod 10, each of which has a main beam direction along the x-axis that is transverse to the y-axis.

FIG. 3 shows a cut through such a pair 14. The reflector 18 focuses the light 16.1 emitted in the form of spherical wave fronts from the second light source 16, ideally forming a light source focused on a point, through reflection on its reflection surface into cylindrical wave fronts, which have a focal axis BA. The reflector surfaces can be fitted to actual light sources and their installation conditions.

FIG. 4 shows a front view without light beams in order to illustrate the position of the focal axis BA. The focal axis BA can be parallel to the y-axis, or it can be tilted at an angle to the y-axis, as indicated by the broken line BA'.

The focal axis BA ideally corresponds to the longitudinal direction y of the elongated fiber optic rod 10 at the point where it is directly in front of the reflector 18 in the direction the light is propagated along the x-axis, and thus follows the contour of the light emitting surface 20.

The reflectors 18 in the pairs 14 focus the light 16.1 from the second light sources 16 onto the deflectors 24 in the rear surface 22 of the fiber optic rod 10. As a result, this light 16.1 enters the fiber optic rod 10 through the rear surface 22 at a direction transverse to the longitudinal direction y, passes through it, and is then emitted from the fiber optic rod 10 through the light emitting surface 20.

In the known signal lights, this passing through the associated fiber optic rod 10 has the following effect on the light distribution emitted from the light emitting surface 20: because the light emitting surface 20 in the form of a convex lens on the fiber optic rod 10 focuses onto the region of the deflection elements 24, the light beams 12.1 from the aforementioned first light source 12 at the end, which strike the light emitting surface 20 from this region, are refracted in the desired manner in the center of the light distribution, and contribute there to the generation of a desired intensity maximum.

These light beams 12.1 are reflected on the tilted reflection surfaces 24.1 of the deflection elements 24.

If instead, light beams 16.1 from the pairs 14 comprising a second light source 16 and a reflector 18 strike the rear surface 22 of the fiber optic rod 10, these light beams 16.1 enter the fiber optic rod 10 through the rear surface 22 of the fiber optic rod 10. As a result, these light beams 16.1 are not reflected on the deflection elements 24, and instead are refracted. These refracted light beams 16.1 are subsequently emitted from the fiber optic rod 10 through the light emitting surface 20. The light emitted from the light emitting surface 20 is therefore composed of two components 12.1, 16.1. These differ in that they strike the deflection elements 24 from two different directions. The component 12.1 strikes the deflection element 24 from the interior of the fiber optic rod 10, and is reflected there. The other component 16.1 strikes it from the exterior and is refracted at that point. As a result, the two components are emitted through the light emitting surface 20 in two different directions and generate undesired different light distributions.

Moreover, the light 16.1 entering through the rear surface 22 is divided into two components at the deflection elements 24 with the form shown in FIG. 1. One component enters the fiber optic rod 10 via the diagonal part, i.e. via the reflection surfaces 24.1 of the deflection elements 24 with a direction-changing refraction. Another component enters the fiber optic rod 10 via parts 24.2 of the deflection elements 24 lying between the diagonal parts 24.1, which are parallel to the y-axis, without any, or only very little, direction-changing refraction. These parts are emitted from the fiber optic rod 10 in different directions and are therefore not combined to generate an intensity maximum. The parts of the deflection elements 24 parallel to the y-axis can be enlarged in order to reduce this undesired effect. This would necessarily reduce the efficiency of the light reflected on the diagonal surfaces 24.1.

The signal light according to the invention substantially differs from the signal light illustrated in FIGS. 1 to 4 with regard to the design of the fiber optic rod 10. FIGS. 1 to 4 illustrate features of the invention as well as the technological field thereof, without being limited thereto. The descriptions of these drawings, and in particular the coordinate system used therein, also apply to the following descriptions of FIGS. 5 and 6, which relate to exemplary embodiments of the invention, as long as not otherwise specified in the FIGS. 5 and 6 and/or the descriptions thereof.

Figure 5:
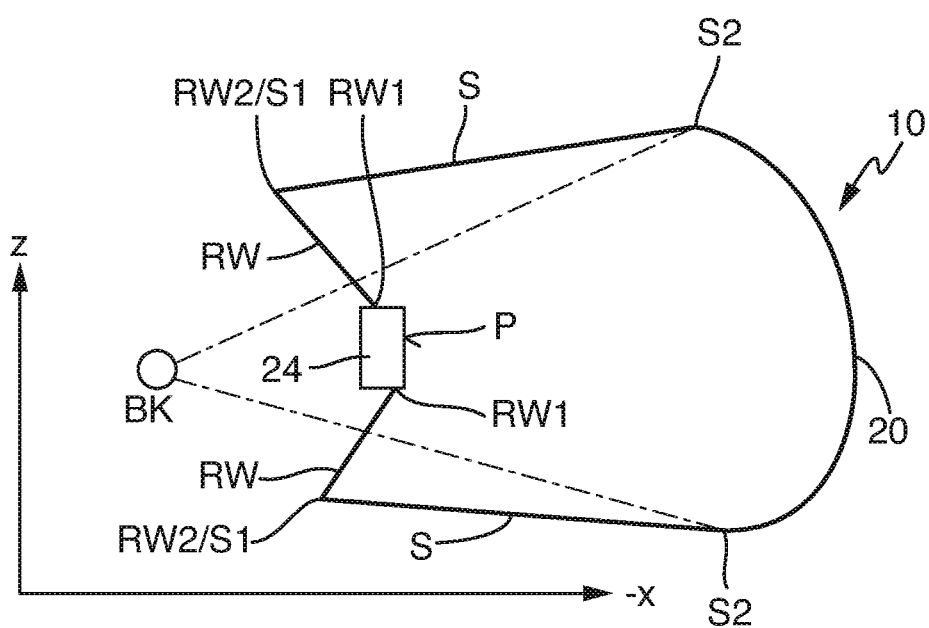
FIG. 5 shows a cut through the fiber optic rod in a signal light according to the invention.

FIG. 5 shows a cut through the fiber optic rod 10 in a signal light according to the invention. The cutting plane is the plane formed by the x- and z-axes in FIG. 5. The convex light emitting surface 20, which therefore acts as a lens, is focused onto a focal curve BK, which is located in the positive x-axis behind the deflection elements 24. The line composed of dots and dashed represents corresponding boundary beams of a light bundle starting from the focal curve BK. The lateral surfaces S are located above and below. The rear walls RW connect them to the deflection elements 24. The deflection elements 24 in a row like that shown in FIG. 1 can form a prismatic fin P.

The focal curve BK follows the elongated shape of the fiber optic rod 10 along the y-axis, and is behind the row of deflection elements 24, seen from the convex light emitting surface 20.

The shapes and positions of the rear wall RW and side walls SW are such that at least portion of the light from the second light sources 16 reflected by the reflectors 18 strikes the rear walls RW due to refraction, and this portion is then deflected by the reflection at the side walls S into a central region of a light distribution that can be projected from the signal light with the light from the second light sources 16.

Figure 6:
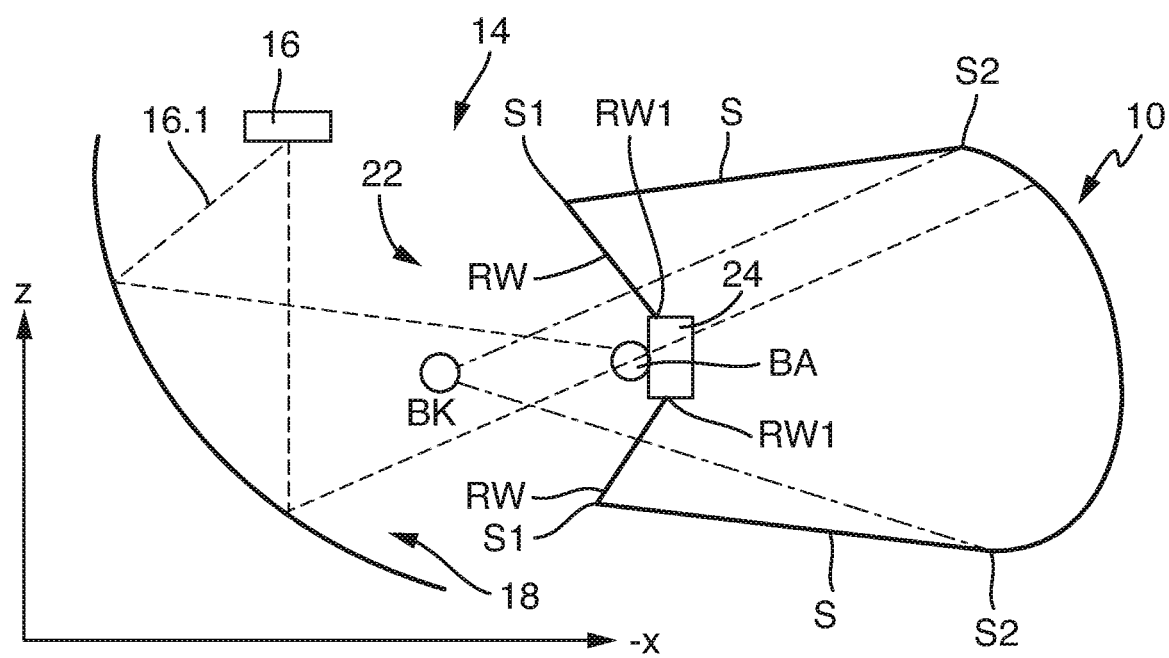
FIG. 6 shows the fiber optic rod in FIG. 5 with a light source and reflector pair lying opposite the rear surface of the fiber optic rod.

FIG. 6 shows the same thing as FIG. 5 with a pair 14 composed of a second light source 16 and a reflector 18 lying opposite the rear surface 22 of the fiber optic rod 10.

The fiber optic rod 10 has two rear walls RW, each of which has a deflection element edge RW1 and a side wall edge S1, which coincides with the rear surface edge S1 of the respective side wall. The rear walls R2 extend longitudinally along the y-axis between the row of deflection elements 24 and the side walls S. The side wall edges S1 of the rear walls RW are spaced further apart than the deflection element edges RW1 in a cross section of the fiber optic rod 10 that is transverse to its longitudinal extension. The rear walls RW form a recess in the rear surface 22.

The fundamental shape of each reflector 18 transforms the light from a spherical wave front from a second light source, ideally forming a light source focused on a point, into a cylindrical wave front with the focal axis BA. The reflector surfaces can be fitted to actual light sources and their installation conditions. The focal axis BA can be tilted in relation to the lateral extension direction of the reflector.

In one embodiment, there is a slight diffusion structure (e.g. in the shape of pillows) formed on the reflector 18, in order to conceal position and manufacturing tolerances. Typical values for this diffusion are 2°-5° vertically (z-axis) and 5°-10° horizontally (y-axis). If there are no further diffusion elements downstream of the fiber optic rod in the light path, greater diffusion values may be necessary here in order to generate the desired light distribution.

One of the special features of the signal light according to the invention is the shape of the rod-shaped optical fiber 10, and in particular the design of its surfaces, which connect the lens-shaped light emitting surface 20 to the rear surface 22, which has the deflection elements 24, in lateral surfaces S and rear walls R, which are at a specific angle to the direction x along which the light travels, or the direction the light travels in the optical fiber (middle of the prismatic fin—middle of the lens-shaped light emitting surface 20).

The focal curve BK of the fiber optic rod 10 is typically further back along the x-axis in embodiments of the invention, i.e. further away from the light emitting surface, than with optical fibers 10 in the signal lights known per se, resulting in flatter (less curved) light emitting surface 20 on the rod-shaped optical fiber 10.

The focal curve BK of the fiber optic rod 10 is preferably further away from the light emitting surface 20 than the focal axis BA along the x-axis.

One exemplary embodiment of a signal light according to the invention is distinguished by an appropriate selection of the following parameters:
  a) The position of the second light source 16 along the z-axis in relation to the middle of the row of deflection elements 24.
  b) The position of the second light sources 16 along the x-axis in relation to the middle of the row of deflection elements 24.
  c) The position of the reflector anchor point along the z-axis in relation to the middle of the row of deflection elements 24. The reflector anchor point lies in the x, z-plane, and intersects the focal axis and the focal curve.
  d) The position of the reflector anchor point along the x-axis in relation to the middle of the row of deflection elements 24.
  e) The position of the focal curve BK along the x-axis, onto which the light emitting surface of the fiber optic rod 10 is focused, in relation to the middle of the row of deflection elements 24.
  f) The angle of the rear wall RW to the plane connecting the middle of the row of deflection elements 24 to the middle of the light emitting surface 20.
  g) The angle of the side wall S to the plane connecting the middle of the row of deflection elements 24 to the middle of the light emitting surface 20.
  h) The position of the focal axis BA along the x-axis that a reflector 18 is focused on, in relation to the middle of the row of deflection elements 24.
  i) The position of the focal axis BA along the z-axis that a reflector is focused on, in relation to the middle of the row of deflection elements 24.

With a fiber optic rod 10 with a height of 7.5 mm, advantageous results are obtained with the following combination of the parameters listed above, by way of example:
  a) 5.5 mm; b) 11 mm; c) −3 mm; d) 11 mm; e) 1.6 mm; f) 111.5°; g) 7.2°; h) 0 mm;
  and i) 0 mm.

This example was obtained by varying the parameters until suitable parameters were identified for generating a daytime running light distribution and a blinker light distribution. It is assumed that an important beam path in the system experiences a refraction at the rear wall RW, a subsequent total reflection at the lateral surface S, and then a refraction at the light emitting surface 20.

A portion of the (second) light distribution generated with the reflectors 18 passes through the tilted reflection surfaces 28.1 in the fiber optic rod 10, which ensure that it functions correctly (for the first light distribution). This portion generates an undesired secondary maximum.

Normally, the tilted reflection surfaces 24.1 at the second end 32 of the fiber optic rod 10 increase in size, in order to obtain a good compromise between homogeneity and efficiency. The portion of angled reflection surfaces 24.1 along the length of the part of the rear surface 22 at the second end, lying opposite the light emitting surface 20, is normally as much as 100% of the angled reflection surfaces 24.1.

This portion is preferably limited to less than 80%, because a part of the light in the light distribution reflected by the reflectors in the pairs is propagated by the portion of the rear surface that is not tilted. Without this portion, the reflectors at the end of the light emitting surface on the fiber optic rod would appear to be darker (in particular when seen from the center of the light distribution). This results in a lower efficiency of the fiber optic rod.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A signal light for a motor vehicle lighting system comprising:
  a fiber optic rod extending in a longitudinal direction, which has a light emitting surface extending along the longitudinal direction which is convex in the direction transverse to the longitudinal extension,
  wherein the fiber optic rod has a rear surface lying opposite the light emitting surface, wherein the rear surface has a row of deflection elements that extend along the longitudinal direction,
  wherein the fiber optic rod has two side walls, each side wall having a rear surface edge and a light emitting surface edge, wherein the fiber optic rod extends between the rear surface and the light emitting surface along the longitudinal direction, wherein the fiber optic rod has two rear walls, each of the rear walls has a deflection element edge, a rear wall edge and a side wall edge, and extends in the longitudinal direction between the row of deflection elements and the side walls, wherein the side wall edges of each of the two rear walls are further apart than the deflection element edges in a cross section of the fiber optic rod that is transverse to the longitudinal direction thereof, and wherein the rear walls form a recess in the rear surface; and a plurality of pairs of a reflector and a light source, wherein the pairs are arranged in a row along the longitudinal direction and configured to project light bundles through the fiber optic rod, wherein each of the light bundles has a main beam direction that is transverse to the longitudinal direction.

2. The signal light as set forth in claim 1, wherein the convex light emitting surface has a focal curve that follows the elongated shape of the fiber optic rod, and which is behind the row of deflection elements when seen from the convex light emitting surface.

3. The signal light as set forth in claim 1, wherein each pair of the reflector and the light source is configured to convert spherical wave fronts from the light source into a cylindrical wave front with a focal axis.

4. The signal light as set forth in claim 3, wherein the focal axis is parallel to the longitudinal direction of the fiber optic rod.

5. The signal light as set forth in claim 4, wherein the focal axis is at an angle to the longitudinal direction of the fiber optic rod.

6. The signal light as set forth in claim 5, wherein the focal axis corresponds to the longitudinal direction of the fiber optic rod at the point where it is directly in front of the reflector in a main light distribution of the associated reflector, thus following the contour of the light emitting surface.

7. The signal light as set forth in claim 6, wherein each pair is configured to focus its light bundle in a focal axis lying in a row of deflection elements in the fiber optic rod.

8. The signal light as set forth in claim 1, wherein the reflection surfaces of the reflectors have a diffusing structure superimposed on the fundamental shape of the reflection surfaces of the reflectors.

9. The signal light as set forth in claim 8, wherein the diffusing structures are configured to diffuse light vertically 2° to 5°, and horizontally 5° to 10° in the intended orientation of the signal light.

10. The signal light as set forth in claim 1, wherein the fiber optic rod has a first end where a light source for projecting light into the fiber optic rod is located, and a second end, which lies opposite the first end in the longitudinal direction, wherein two adjacent deflection elements are spaced apart at a distance that decreases as the distance between adjacent deflection elements to the first end increases, wherein the distance between adjacent deflection elements is not less than 20% of the distance to two adjacent deflection elements.

11. The signal light as set forth in claim 1, wherein the rear wall and side walls are configured such that at least a portion of the light from the light sources reflected by the reflectors strikes the rear walls due to refraction, and this portion is deflected by reflection on the side walls into a central region of a light distribution that can be projected with the signal light using the light from the light sources.

* * * * *